United States Patent Office 3,164,366
Patented Jan. 5, 1965

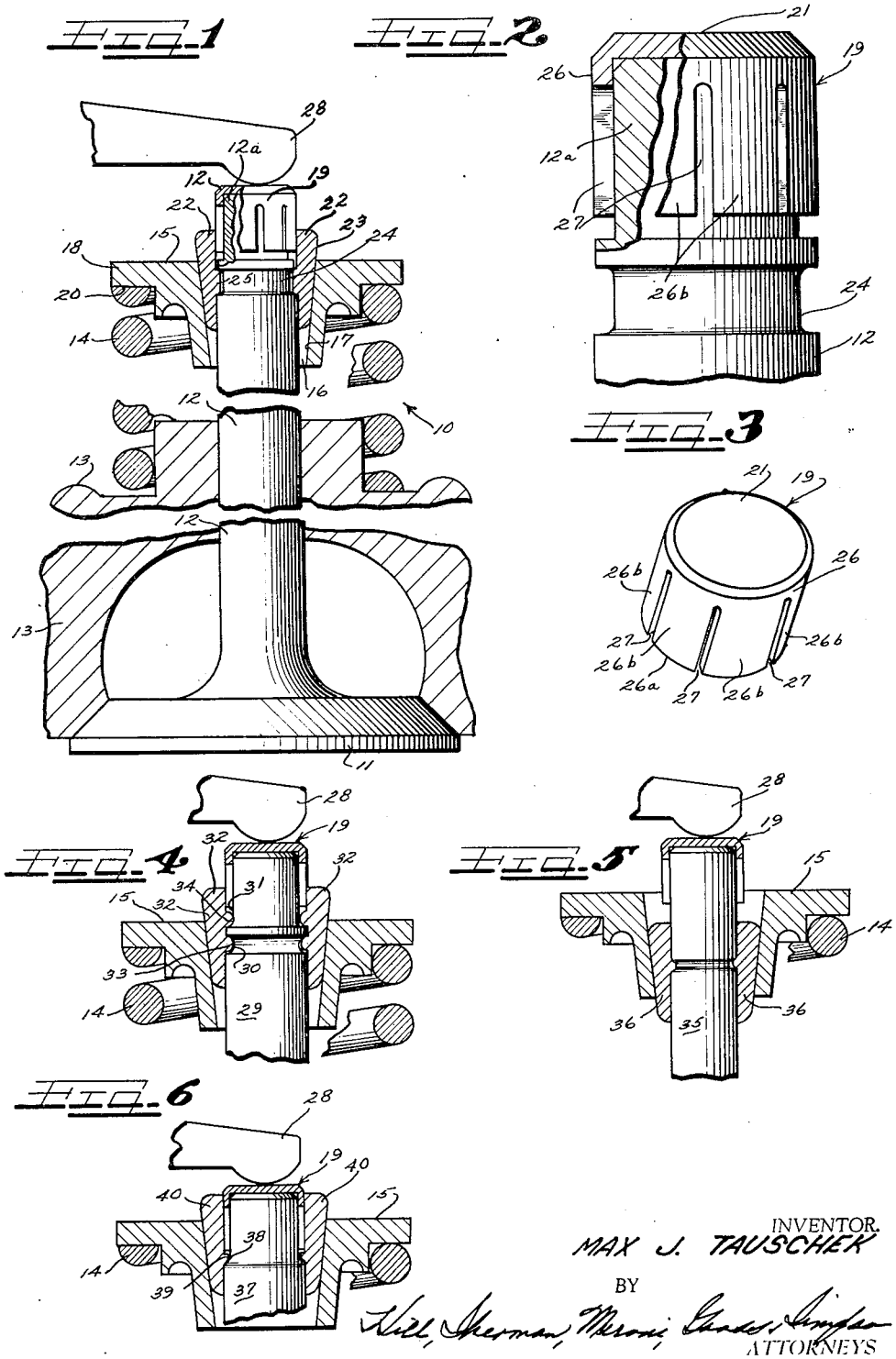

3,164,366
VALVE TIP CONSTRUCTION
Max J. Tauschek, Lyndhurst, Ohio, assignor to Thompson Ramo Wooldridge Inc., Cleveland, Ohio, a corporation of Ohio
Filed Dec. 27, 1961, Ser. No. 162,372
3 Claims. (Cl. 251—337)

This invention relates generally to valve tip construction, and more specifically to an improved cup-tip adapted to be retained by itself on a valve stem tip, even when not installed in an engine.

The principles of the present invention are particularly useful in connection with engine installations where wear-resistant tips are necessary, a condition which arises in connection with quantity production of certain engines.

Heretofore, it has been known to weld a wear-resistant high-hardenable valve tip to a valve stem. However, the welding operation is accompanied with a substantial manufacturing cost. It has also been known to employ separate or loose wear-resistant high-hardenable valve tips, such loose valve tips being handled separately from the valves during installation, and held in place against the valve stem by other components such as the valve retainer locks. Such structure has the disadvantage of the added labor cost in handling and stacking and assembling two separate parts in place of one.

In accordance with the principles of my invention, the expense of the welding operation is eliminated, and the expense of handling, storing, and assembling two different parts is also eliminated. In place thereof, there is provided a wear-resistant high-hardenable valve tip made of any suitable material, which tip is assembled to the end or tip of the stem of the valve, and is retained thereon by frictional engagement therewith, the frictional forces of such engagement being supplemented by the associated structure in the assembly to hold the wear-resistant member firmly in position.

Accordingly, it is an object of this invention to provide an improved wear-resistant high-hardenable wear member or tip for the end or tip of the valve stem.

A further object of the instant invention is to provide a wear member for the valve tip of a valve assembly which is retained on the valve stem without welding when the valve is outside of the valve assembly.

A still further object of the present invention is to provide a wear member for the valve tip of a valve assembly which, although normally carried in a secure fashion on the valve stem, is removable without heat for replacement.

Yet another object of the present invention is the provision of wear member structure which enables it to be temporarily fastened on a valve stem so that it can be handled as one piece during shipping and assembly in the engine.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

FIGURE 1 is an elevational view, partly in section, illustrating a wear member in a valve assembly in accordance with the principles of the present invention;

FIGURE 2 is an enlarged fragmentary portion of FIGURE 1 illustrating the manner in which the wear member is carried and stored before and during assembly;

FIGURE 3 is an enlarged perspective view of a wear member provided in accordance with the principles of this invention; and FIGURES 4, 5, and 6 illustrate the same wear member employed in valve assemblies where the other associated components differ as to structural details.

As shown on the drawings:

The principles of this invention are particularly useful when embodied in a valve assembly such as illustrated in FIGURE 1, generally indicated by the numeral 10. The valve assembly includes a valve 11 having a valve stem 12. The valve 11, in turn, is installed in a portion of the engine 13 which supports a valve spring 14 which bears against the valve assembly 10.

The valve assembly shown in FIGURE 1 comprises a valve cap 15 which has a bore 16 therethrough defined by an inner surface 17. The bore 16 is preferably made in a tapered fashion as shown. The cap 15 also has an annular flange 18 which has a lower annular face 20 against which one end of the spring 14 is in engagement. Since the spring 14 is under compression, an upward force is thereby directed against the lower face 20 of the cap 15.

Within the bore 16 of the cap 15, there are positioned a number of locks, such as two or three, each numbered 22. Preferably, but not necessarily, these locks are made identical to each other. The locks have an outer surface 23 which mates with the surface 17 of the cap 15 as shown in FIGURE 1. The locks have been here shown as having an outer surface 23 which is tapered correspondingly to the inner surface 17 of the cap 15. While it is preferable that both of these surfaces be tapered, it will be apparent from the description which follows that an operative combination needs to have only one tapered surface, i.e. surface 17 or surface 23. When the locks are brought together to the position shown in FIGURE 1, the locks 22 collectively define an opening in which the stem 12 of the valve 11 is received.

The inner surface of each of the locks 22 is adapted to clamp against the stem 12 on the upper end of which is carried a wear member 19, against which the inner surfaces of the locks 22 are also adapted to be clamped. In the form illustrated in FIGURE 1, the stem 12 also has a groove or channel 24 into which are received inwardly directed shoulders 25 on the locks 22. It will be noted that the shoulders 25 or flanges do not extend to the bottom of the groove 24, and are here used primarily for locating the locks 22 during assembly. The nature of the assembly is such that the grasping force is primarily between the locks 22 and the stem 12 and wear member 19 outside of the groove 24, whereby a minimum amount of shear force is applied to the flange 25.

Prior to installation in the engine, such as at the manufacture of the valve 11, the wear member 19 is placed on the tip end 12a of the stem 12, and the valve 11 with its wear member 19 is thus handled, stocked, shipped, sold, and assembled as a unit. This relationship is illustrated in FIGURE 2.

Referring to FIGURES 2 and 3, the wear member 19 includes a disc portion 21 which comprises wear-resistent hardenable material, and integrally attached to the disc portion 21, there is a cylindrical skirt 26. The skirt 26 is provided with a series of slots 27 each of which is defined by a pair of confronting shoulders which form a part of the skirt 26. The slots 27 extend from an edge 26a of the skirt in a direction parallel to the axis of the disc, the direction being toward the disc portion 21 from the edge 26a. Thus, the various slots 27 define a series of fingers 26b, each of which is slightly resilient. The diametral clearances are such that when the wear member 19 is placed on the end 12a of the stem 12, the fingers 26b are urged slightly radially apart, whereby the individual resilient fingers 26b radially grasp the end 12a of the stem 12 to hold the wear member 19 thereon. The force by which the wear member 19 is thus retained needs to be only sufficient to hold the wear member 19 on the stem 12 during handling, installation, etc., since once the same has been installed as shown in FIGURE 1, the retainer locks 22 as well as a rocker arm 28 associated therewith severally serve to hold the wear member in proper operating position. Thus, it is seen that the resilient fingers 26b resiliently embrace the tip end 12a of the stem 12.

The cap 15 is also known in the trade and art as a spring retainer, the terms being used herein interchangeably.

The wear member 19 may be economically fabricated, as by stamping, and owing to the radial yieldability of its fingers 26b, it may be provided during manufacture with rather liberal manufacturing tolerances.

It is to be emphasized that in the illustrated assembly, the tapered valve retainer locks 22 clamp the wear member in place primarily by a friction locking effect, the locking bead, shoulder and channeling being employed to serve mainly to position the locks 22 during assembly thereof.

Thus, without welding, there is provided a structure where the wear member is not separate, where no separate wear member retainer means is employed during handling, whereby a considerable amount of manufacturing cost may be saved wherever a structure of this type is needed.

Referring to FIGURE 4, it will be seen that the wear member 19 is carried on a stem 29 having a tip end which is provided with a groove 30 and an undercut portion 31 on which the wear member 19 is received. Valve retainer locks 32, 32 include shoulders 33 and 34, the shoulder 33 being received in the groove 30, and the shoulder 34 being received in the undercut portion 31 adjacent to the end of the wear member 19.

Referring now to FIGURE 5, it will be seen that the wear member 19 is carried on the end of a stem 35, being held thereon by the fingers 20b during normal handling, the forces from the fingers 26b being aided by the rocker arm 28 in holding the wear member 19 on the stem 35 during operation. In this installation, the valve retainer locks 36, 36 of a conventional type are employed with the cap or spring retainer 15.

Referring now to FIGURE 6, it will be seen that a stem 37 has been undercut as at 38 to receive both the cap 15 and the bead or flange 39 of the retainer locks 40. The frictional nature of the engagement between the blocks or locks 40 and the stem 37 and wear member 19 is thus emphasized. However, it is to be understood that this property is present to a significant extent in each of the illustrated modes of installation for the wear member 19.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A valve assembly comprising in combination:
   (a) a valve having a stem terminating in a reduced diameter tip having a continuous cylindrical surface;
   (b) a wear member including a wear-resistant disc portion disposed against an end face of said tip, said wear member having a series of integral resilient internally smooth fingers extending within the axial extent of and grasping said continuous cylindrical surface of said reduced diameter tip, said fingers frictionally holding said wear member thereon of themselves, said wear member having an outermost surface at said fingers of substantially the same size as that of the outermost surface of the end of said stem;
   (c) a plurality of valve retainer locks jointly encircling and each disposed in engagement with a number of said resilient fingers and with the end of said stem at said outermost surface thereof; and
   (d) a spring retainer adapted to urge said locks into a grasping frictional relation against said number of fingers to supplement the grasping force of said fingers against said stem, and also to urge said locks into a grasping frictional relation with said reduced diameter tip.

2. A valve assembly comprising in combination:
   (a) a valve having a stem terminating in a tip having a continuous cylindrical surface;
   (b) a wear member including a wear-resistant disc portion disposed at an end face of said stem against said tip, said wear member having a series of at least four integral resilient fingers extending within the axial extent of and grasping said cylindrical surface of said stem, said fingers frictionally holding said wear member thereon of themselves;
   (c) a plurality of no more than three separate valve retainer locks jointly encircling and engaging at least four of said resilient fingers; and
   (d) a spring retainer operative in response to an axially directed spring force thereagainst to urge said locks radially against said four engaged resilient fingers to provide forces thereagainst which supplement the grasping forces of said resilient fingers against said stem tip.

3. A valve assembly comprising in combination:
   (a) a valve having a stem terminating in a tip having a continuous cylindrical surface;
   (b) a wear member including a wear-resistant disc portion disposed at an end face of said stem against said tip, said wear member having a series of at least four integral resilient fingers extending within the axial extent of and grasping said cylindrical surface of said stem, said fingers frictionally holding said wear member thereon of themselves;
   (c) a plurality of no more than three separate valve retainer locks jointly encircling and engaging at least four of said resilient fingers, each lock also having a portion axially spaced from said fingers and engaging the end of said stem at its radially outermost surface; and
   (d) a spring retainer operative in response to an axially directed spring force thereagainst to urge said locks radially against said four engaged resilient fingers to provide forces thereagainst which supplement the grasping forces of said resilient fingers against said stem tip, and also operative to urge said portion of each of said locks, radially into a grasping frictional relation with said radially outermost surface of the end of said stem.

References Cited in the file of this patent

UNITED STATES PATENTS

| | | |
|---|---|---|
| 976,274 | McHardy | Nov. 22, 1910 |
| 1,017,993 | Ottaway | Feb. 20, 1912 |
| 2,705,483 | Temple | Apr. 5, 1955 |
| 2,904,024 | Kurz | Sept. 15, 1959 |

FOREIGN PATENTS

| | | |
|---|---|---|
| 340,591 | Great Britain | Jan. 2, 1931 |
| 428,998 | Great Britain | May 22, 1935 |
| 1,075,196 | France | Apr. 14, 1954 |